3,361,555
METHOD OF STIMULATING PLANT GROWTH
Robert J. Herschler, Camas, Wash., assignor to Crown Zellerbach Corporation, San Francisco, Calif., a corporation of Nevada
No Drawing. Filed Apr. 13, 1966, Ser. No. 542,189
8 Claims. (Cl. 71—103)

This application is a continuation-in-part of copending application Ser. No. 346,366 filed Feb. 10, 1964, and a continuation-in-part of copending application Ser. No. 344,558 filed Feb. 13, 1964, now abandoned.

This invention relates generally to a method for stimulating the metabolic functions of microscopic and macroscopic plants.

When the word "metabolism" is employed herein, it is intended to refer to the total chemical changes by which the nutritional and functional activities of an organism are maintained. The phrase "stimulation of metabolic function" is intended to refer to the enhancement of the metabolic function, which may take the form of an increase in the rate of the metabolic function and/or an increase in the products of the metabolic function (metabolites). Whenever the term "plant" is referred to herein, it is intended to include both microscopic and macroscopic plants. The microscopic plants intended to be included are those microorganisms generally considered by the microbiologist to be plants, and especially various bacteria, fungi and yeasts. The macroscopic plants intended to be included are those macroscopic living organisms considered by the biologist to be plants, and especially those macroscopic plants which are useful to man, either in themselves or because of their harvestable products.

A primary object of this invention is to provide a method for effecting stimulation of the metabolic functions of plants by an agent which may be easily and safely employed.

Another object is a method to increase the vegetative growth of plants by contacting them with a sufficient amount of a particular compound.

Another object is a method of increasing the production of metabolites in plants by contacting them with a sufficient amount of a particular compound.

These objects are attained along with other objects which will become apparent when reading the following disclosure.

It has been found that stimulation of plant metabolic functions may be obtained by contacting them with an effective amount of dimethyl sulfoxide. Dimethyl sulfoxide has low mammalian toxicity which permits it to be handled safely, and is supplied by the Crown Zellerbach Corporation, San Francisco, Calif. It is a water-clear liquid melting at about 18.5° C. and boiling at about 189° C. Dimethyl sulfoxide may be prepared by various methods such as described in U.S. 2,581,050, U.S. 2,935,533, and U.S. 2,702,824.

It has been found that vegetative growth of microorganisms is enhanced with effectively small amounts of dimethyl sulfoxide, and that spore formation is depressed while the vegetative cell growth and production are stimulated. Stimulation of vegetative growth is shown with fungi such as *Aspergillus niger, Penicillium notatum, Penicillium digitatum*, and the like; with true yeasts of the family Endomyceteae such as Brewer's yeast or *Saccharomyces cerevisiae*; and with bacteria such as *B. amylobacter* which is used in the acetone-bacterial fermentation process.

Induction of spore formation theoretically could be due to a tie-up of calcium and/or other essential nutrients. Dimethyl sulfoxide may interfere with the metabolic process or changes therein which induces spore formation. It is to be emphasized, however, that the particular mechanism involved is not critical to an understanding of the results described herein, and the foregoing hypotheses are not to be construed as limiting or binding.

This property of increasing vegetative growth may be useful in the treatment of sewage wherein increased vegetative growth of the microorganisms responsible for decomposition would be useful. Also, increasing the yield and/or decreasing the production time of certain products of vegetative growth of microorganisms (metabolites) may be highly desirable; exemplary of such products are antibiotics, alcohols such as ethanol, butanol, and glycerol, acetone, polysaccharides such as dextrans, ergot alkaloids, acetaldehyde, various organic acids such as cetic, citric, lactic, propionic, gluconic, fumaric, itaconic and kojic, vitamins, amino acids, gibberellins, enzymes and protein synthesis.

Illustrative of microorganisms employed in obtaining the foregoing exemplary products are: the various species of Streptomyces, Penicillium and Cephalosporium fungi used in manufacturing antibiotics; various species of Saccharomyces yeast used in manufacturing alcohols; the Clostridium bacterium used in manufacturing acetone and butanol; the various strains of Acetobacter, Betabacterium, Leuconostoc, Streptobacterium and Streptococcus employed in the manufacturer of dextrans; species of the ergot fungus Claviceps employed in manufacturing ergot alkaloids; various species of Acetobacter and Acetomonas employed in manufacturing acetic acid; *Aspergillus niger* used in manufacturing citric and gluconic acids; the species of Lactobacillus employed in manufacturing lactic acid; the Propionibacterium employed in manufacturing propionic acid; species of Rhizopus employed in the manufacture of fumaric acid; *Aspergillus terreus* used in manufacturing itaconic acid; various species of Aspergillus used in manufacturing kojic acid: the yeast *Ashbya gossypii* employed in manufacturing the vitamin riboflavin; the actinomycetes *Streptomyces olivaceus* or the bacterium *Bacillus megaterium* used in manufacturing Vitamin $B_{12}$; members of the phycomycetes genera Choanephora or Blakeslea useful in manufacturing Vitamin A; the bacteria *Aerobacter aerogenes* or *Escherichia coli* employed in manufacturing the amino acid lysine; the strains of *Gibberella fujikuroi* used in manufacturing gibberellins; the various species of Aspergillus, Bacillus, Saccharomyces, Streptomyces, Penicillium, Rhizobium and Clostridium useful in manufacturing various hydrolytic and non-hydrolytic enzymes; and various yeasts such as *S. cerevisiae* and *Candida utilis* useful in furnishing protein.

In the culturing of all of the aforementioned microscopic plants, conventional incubation temperatures and growth mediums are employed, which are well known in the art, with the exception that dimethyl sulfoxide is added to the medium in an amount sufficient to stimulate metabolic functions, but not in amounts so great as to inhibit or stop the growth of the microorganisms.

The amount of dimethyl sulfoxide which stimulates vegetative growth is generally small, and is generally at least about from 20 p.p.m. to 500 p.p.m. The property of stimulated vegetative growth is demonstrated with amounts of dimethyl sulfoxide of up to about 3% by weight. Above about 3% by weight of dimethyl sulfoxide in an environment containing microorganisms, a biocidal or biostatic effect is obtained. Dimethyl sulfoxide stimulates the metabolic process of microscopic plants cultured under both aerobic and anaerobic conditions, although it appears to give superior results in aerobic cultures.

In the production of antibiotics, the processes generally involve cultivating the antibiotic-producing microorganism in a suitable nutrient medium under aerobic conditions with agitation, preferably at a temperature of about 22° C. to 32° C. The standard culture media contain a source of carbohydrate, such as sugars, starch, and glycerol; a source of organic nitrogen, such as bean meals and particularly soybean meal, wheat gluten, cotton seed meal, lactalbumin, and enzymatic digests of proteins; and a growth-promoting substance, such as distillers solubles and yeast extracts. Mineral salts, such as sodium chloride, sodium nitrate, and potassium phosphate, a buffering agent such as calcium carbonate and a vegetable or mineral oil are also usually incorporated therein. In accordance with the present invention dimethyl sulfoxide is also added to the growth media in an amount which stimulates antibiotic production. After growth for a suitable period of time at which an appreciable antibiotic potency has been imparted to the medium, generally a period of about one to five days, the mycelium which is formed is separated from the broth containing the elaborated antibiotic, and the latter is then recovered by various conventional procedures.

The following table sets forth generally suitable conventional procedures for the production of various products of microbial growth. Again, in accordance with the present invention, a growth-stimulating amount of dimethyl sulfoxide is added to the growth media. These conditions are to be considered illustrative only, and not limiting:

EXAMPLE 1

*Stimulation of fungi with different concentrations of dimethyl sulfoxide*

Two batches of fortified corn steep broth were prepared according to the following formulation:

| Ingredient: | Parts by weight |
| --- | --- |
| Lactic acid | 2.3 |
| Total nitrogen | 0.7 |
| Amino nitrogen | 0.3 |
| Reducing sugars | 0.7 |
| Inert solids | 2.1 |
| Potassium dihydrogen phosphate | 0.1 |
| Magnesium sulfate | 0.005 |
| Water, sufficient to make | 100 |

Strains of *Penicillium notatum* were cultured in one batch and strains of *Aspergillus niger* were cultured in the second batch. These fungi fall within the filamentous ascomycetes class. To each culture in each group was added dimethyl sulfoxide in sequential amounts which increased incrementally. The first addition was 500 p.p.m. and then 10,000 p.p.m., which was equivalent to 1% by weight of the culture. Thereafter, the amount was increased by 1% through a series starting at 1% and ending at 10%. The culture conditions otherwise remained standard.

TABLE I.—GROWTH CONDITIONS FOR VARIOUS MICROORGANISMS

| Product | Microorganisms | Substrate | Type of Culture | pH | Temp., °C. | Time, Days |
| --- | --- | --- | --- | --- | --- | --- |
| Acetonebutanol | *Clostridium acetobutylicum*. | Molasses diluted to 5-7% sugar, with addition of ammonium compounds and CaHPO$_4$ as required. | Anaerobic | 5.0-7.0 | 29-34 | 1.7-2 |
| Dextran | *Leuconostoc mesenteroides*. | Sucrose plus nutrients | do | 4.5-7.0 | 20-30 | 1-5 |
| Ergot alkaloids | *Claviceps purpurea* | Yeast extracts, mannitol | Aerobic | 4-7 | 20-32 | 43 |
| Bacterial amylase | *Bacillus subtilus* | Vegetable protein plus sugar for surface; starch, cereal grain, and protein for subsurface. | Surface, aerobic, or subsurface, aerobic. | 6.5-7.0 | 30-40 | 1-3 |
| Bacterial protease | *B. subtilus* | 1% protein, 6% carbohydrate, salts | Surface, arobic | 6.5-7.0 | 37 | 3-5 |
| 5-ketogluconic acid | *Acetobacter suboxydans*. | Glucose | Aerobic | 4.5-7.0 | 30-35 | 1.5-2.5 |
| Fumaric acid | *Rhizopus nigricans* | 5-10% invert sugar, plus nutrient salts and CaCO$_3$. | Subsurface, aerobic | 5-6 | 33 | 4 |
| Itaconic acid | *Aspergillus terreus* | 6.6-27.5% glucose or sucrose (molasses) plus (NH$_4$)$_2$SO$_4$, MgSO$_4$, corn steep liquor. | Subsurface, or surface, aerobic. | 1.8-2.2 | 35 | 2-3 |
| Riboflavin | *Ashbya gossypii* | Glucose and purified sucrose or maltose and corn steep liquor. | Submerged, aerobic | 6-7 | 26-28 | 4-5 |
| Lysine | *Escherichia coli* | Glycerol, corn steep liquor and salts, 0.5% CaCO$_3$. | Aerobic | 7-7.5 | 28 | 3 |
| Gibberellin | *Gibberella fujikuroi* | Glucosetartrate salts | Submerged, aerobic | 5-6 | 25-35 | 8 |
| 11-V-hydroxyprogesterone. | *R. arrhizus, R. nigricans*, etc. | Progesterone, plus lactalbumin digest, corn steep liquor, glucose. | Aerobic | 4.4-6 | 24-28 | 2-3 |

Much of the data in Table I was obtained from the standard reference work "Handbook of Biological Data," W. S. Spector (ed.), W. B. Saunders Co., Philadelphia, 1956, to which reference is made for more specific data, and for growth data relative to these microorganisms which have not been specifically set forth herein. It is to be understood, however, that the present invention is concerned with stimulating the metabolic functions of microscopic plants in general by employing an effective amount of dimethyl sulfoxide, and the microorganisms and their growth conditions specifically set forth are intended to be illustrative only and not limiting as it is apparent that the presence of dimethyl sulfoxide may stimulate the metabolic functions of many microorganisms not specifically mentioned.

It is to be emphasized that sporulation may not be completely terminated. However, much useless sporulation, which occurs at the expense of vegetative growth, is inhibited.

The following examples are presented to illustrate various embodiments of the invention with respect to treatment of microscopic plants, but it should be understood that they are not meant to represent an exclusive teaching.

Concentrations of the microorganisms in the broth were determined after each addition. It was shown that concentrations of dimethyl sulfoxide up to about 3% measurably enhanced vegetative growth with a maximum yield of 16% compared to a control yield of about 1.5% based on total medium weight. Sporulation at the same time was depressed with incremental increases of dimethyl sulfoxide concentrations. Above 5% dimethyl sulfoxide concentration levels the growth was depressed, being at the lowest level in the highest dimethyl sulfoxide culture concentration of 10%. Enhanced vegetative growth may therefore be obtained with lower dimethyl sulfoxide concentrations in the culture. Higher concentrations tend to inhibit growth of both vegetative and spore forms of fungi in the culture.

EXAMPLE 2

*Treatment of municipal sewage*

The increased vegetative growth of the microorganisms responsible for the oxidation of the organic matter in sewage by the addition of dimethyl sulfoxide to the growth environment may be demonstrated as follows:

Two samples of fresh municipal sewage are obtained and activated sludge added to each. Immediately thereafter 0.25% by weight of dimethyl sulfoxide is added to one of the samples. Both samples are vigorously agitated aerobically for a period of 4 hours. The particles of floc obtained are gelatinous in nature and contain a large number of bacteria, many of which form slime. Other microorganisms, such as yeasts, molds, and protozoa, may also be enmashed in the floccule, which includes numerous inert particles of the sewage as well. Agitation of the samples furnishes copious supply of oxygen providing ideal conditions for oxidation. The over-all process is conducive to very vigorous growth of microorganisms which readily metabolize the organic matter entrapped in the floccules. The addition of dimethyl sulfoxide to the sewage increases the rate of vegetative growth of various of the microorganisms responsible for this oxidation, thereby increasing the oxidation rate. The biological oxygen demand (BOD) of the fresh sewage before treatment is about 20 to 50 p.p.m. The BOD of the standard treated sewage sample after treatment is about 2.5 to 5.0 p.p.m., whereas the BOD of the DMSO treated sample is about 1.6 to 2.5 p.p.m.

EXAMPLE 3

*Treatment of industrial sewage*

This example illustrates how the waste liquor from pulping operations may be treated with enhanced results. Samples of sulfite waste liquor of 15% solids are obtained and the biological oxygen demand (BOD) determined to be 30,000 parts per million (p.p.m.). Two samples of this waste liquor are placed into containers and inoculated with a mixed adapted culture of microorganisms known to operate upon the organic matter of the waste liquid. One of these two samples is also injected with 0.75% by weight dimethyl sulfoxide, the other sample serving as a control. Fermentation is carried out aerobically for a period of 8 hours. At the end of this period, the BOD of each sample is determined by standard procedures. The BOD of the control sample is about 9,000 p.p.m., whereas the BOD for the sample treated with the dimethyl sulfoxide is less, being about 7,500 p.p.m. This illustrates that the presence of dimethyl sulfoxide increases the vegetative growth of the aerobic bacteria which oxidize the organic matter in the waste liquor, thereby resulting in a more complete removal of those materials which are oxidizable. The polysaccharides and simple sugars contained in the sulfite waste liquor are more efficiently broken down into carbon dioxide and water where dimethyl sulfoxide is added to the waste liquor.

EXAMPLE 4

*Production of streptomycin*

This example illustrates how the production of streptomycin may be enhanced by the presence of dimethyl sulfoxide in the growth medium. A growth medium containing the following materials is prepared:

Ingredient:
| | |
|---|---|
| Glucose _____grams per liter__ | 25 |
| Extracted soy bean meal _____do____ | 40 |
| Distillers dried solubles _____do____ | 5 |
| Sodium chloride _____do____ | 2.5 |
| Dimethyl sulfoxide _____p.p.m.__ | 5,000 |

The foregoing medium is inoculated with a phage-resistant strain of *Streptomyces griseus* and incubated at a temperature in the range of 24° C. to 30° C. and a pH of 7.6 to 8 for 5 days. A control sample is also inoculated and incubated which contains all the ingredients of the foregoing medium except that it contains no dimethyl sulfoxide. At the end of 5 days both the control and the dimethyl sulfoxide-containing culture is harvested for the antibiotic. The culture containing dimethyl sulfoxide produces about 15% more antibiotic units than the control. This is believed due to the enhancement of the vegetative growth of *S. griseus*.

EXAMPLE 5

*Production of citric acid*

The increase in production of citric acid in a medium containing dimethyl sulfoxide may be shown as follows: Culture vessels containing a 20% sucrose solution and suitable nutrients are inoculated with *Aspergillus niger*. Some of the culture vessels also contain 5,000 p.p.m. dimethyl sulfoxide in the growth medium while others (controls) do not. The inoculated vessels are aerobically fermented at 25°–30° C. for a period of 10 days. The liquor is drawn off, the mycelium washed and pressed to remove any citric acid present within the cells, and the liquor transferred to another vessel where the citric acid is recovered by precipitation as the calcium salt. The citric acid yield of the controls is about 50% by wegiht while that of the dimethyl sulfoxide-treated culture is about 65% by weight based on the sucrose.

The foregoing examples were directed to the treatment of microscopic plants. The treatment of microscopic plants by contacting them with an effective amount of dimethyl sulfoxide also results in a stimulation of metabolic function. It has been found that such stimulation of the metabolic functions of macroscopic plants may take one or more of several forms, such as increased rate of growth; an increase in size and/or weight; an increase in the products of the metabolic function, such as rosin, mint oil, latex, alkaloids, quinine, sugars, tannins, waxes, and others; and an increase in the size, quantity and/or quality of the harvestable portions of macroscopic plants, such as fruits, nuts, grains, vegetables, flowers, tubers, etc.

The types of macroscopic plants that may be effectively treated by the method described herein does not appear to be limited, and the treatment is applicable to both broad leaf and narrow leaf plants, deciduous and coniferous, annual and perennial. Exemplary of such macroscopic plants are grasses, cereals, vegetables, flowers, vines, fruit trees, citrus trees, shade trees, forest land trees, herbaceous plants, shrubs, etc.

The mechanism whereby stimulation of macroscopic plant metabolic functions is effected is not known with certainty. The effect may be due to an enhancement of the movement of nutrients across membranes into the plant and/or into the plant cells. The effect may be due to the stimulation of growth hormone (auxin) production. Among such auxins whose production may be enhanced are the following:

Auxentriolic acid (auxin *a*)
Auxin-*a* lactone
Auxenolonic acid (auxin *b*)
3-indole acetic acid (heteroauxin)
Heteroauxin methyl ester
Heteroauxin ethyl ester
Heteroauxin n-propyl ester
Heteroauxin isopropyl ester
1-methyl-3-indole acetic acid
2-methyl-3-indole acetic acid
5-methyl-3-indole acetic acid
Methyl 5-methyl-3-indole acetate
2-3-indole propionic acid
3-indole-pyroracemic (pyruvic) acid Some of the influences that auxins exert upon various macroscopic plants are: more rapid and uniform germination; more rapid initiation and growth of roots; better bud, flower and fruit development; greater fruit or seed set by fortifying pollination and/or reducing blossom drop; reducing the acidity of fruit; inducing stem elongation, bushing and/or weight increases of various plant parts; reducing root shock and length of wilting period in transplants; inducing seedlessness; maintenance of dormancy to prevent too early sprouting, budding or blossoming; breaking the dormancy of tubers, bulbs, etc.; providing the healing of plant wounds; and prevention of preharvest drop of fruit by inhibiting abscission. It is to be noted that not all of the foregoing effects will be obtained in any one macroscopic plant or with any one auxin, but the effects obtained will depend upon the particular plant involved and the particular auxins produced thereby, as well as environmental factors.

Again, however, it is to be emphasized that the particular mechanism or mechanisms involved is not critical to an understanding of the results described herein, and the foregoing hypotheses are not to be construed as limiting or binding.

By the phrase "contacting macroscopic plants" with an effective amount of dimethyl sulfoxide it is intended to mean both external contact, as with a spray, mist or bark paint application of dimethyl sulfoxide, and internal contact as with injection of dimethyl sulfoxide into the plant xylem. It has been found that with external contact of macroscopic plants with dimethyl sulfoxide, the latter has the extraordinary property of penetrating the outer layers of the plant parts contacted and moves into the plant where it is translocated systemically, i.e., throughout the vascular system of the plant. With internal contact, the penetration of the outer layers is effected mechanically and the dimethyl sulfoxide is then translocated systemically from the point of injection, although it is possible that some further penetration from the point of injection may be necessary for the dimethyl sulfoxide to enter the vascular system of the plant.

The dimethyl sulfoxide may be contacted with the macroscopic plants as an aqueous solution or in an inert carrier. The aqueous solution is preferred, however.

If the mode of contact is by xylem injection, it is sometimes desirable to incorporate acetone into the solution. The latter acts as an antifreeze, which is needed if low environmental temperatures are involved, as dimethyl sulfoxide freezes at 68° F.

The concentration of dimethyl sulfoxide employed, which constitutes an "effective amount," will depend upon the type and size of the macroscopic plant involved, the stage of development from the emergent period for deciduous plants, and the mode of contact. Concentrations of dimethyl sulfoxide as high as about 100% in weight are tolerated by conifers, but for tender deciduous and herbaceous plants, lesser concentrations of less than about 25% are preferred. Concentrations as high as about 100% by weight may be employed where the contact is effected by bark paint, but concentrations as low as being in the parts per million range may be preferred for drench or other heavy applications. For spray application, 2% by weight is a good starting point. It should be noted however, that these figures are not absolute for any particular plant or mode of contact, but rather are given to serve as guidelines, as the identity of the plant, its size, the stage of development of its leaves, and the mode of application must all be considered in determining the optimum concentration to employ. The term "effective amount" therefore is intended to mean an amount of dimethyl sulfoxide which is effective, for a particular plant and mode of application, to stimulate the metabolic functions of the plant, but insufficient to cause undue phytotoxicity.

It has been noted that it is more desirable to effect the treatment during non-dormancy.

The number and frequency of application of dimethyl sulfoxide to macroscopic plants again depends upon the many factors enumerated before. Generally speaking, however, application at intervals of 14–28 days during the growing season is satisfactory.

The following examples are presented to illustrate various embodiments of the invention relative to the treatment of macroscopic plants, but it is to be understood that they are not meant to represent an exclusive teaching.

EXAMPLE 6

Stimulation of plant growth

Plantings of zinnia, marigold, bean, corn and cucumber were made in three natural soil types:

(1) High humus soil
(2) Sandy loam; and
(3) River sand

Replicated flats were watered with distilled water containing 0, 1, 5 and 10 p.p.m. of dimethyl sulofxide. Each test received the same volume of water fed by bottom irrigation once a week for six weeks, no fertilizers were added.

All the plants in flats receiving dimethyl sulfoxide in the water showed a good response and since the soil was not sterilized the few weeds present also showed a growth response. The optimum level of dimethyl sulfoxide in this greenhouse testing was 5 p.p.m. At the end of 6 weeks, the plants from these flats averaged more height and top growth weight. It is believed that dimethyl sulfoxide enhanced root assimilation of nutrients and/or production of growth hormones to induce faster growth.

EXAMPLE 7

Protection of plants against adverse climatic conditions

This example illustrates how application of dimethyl sulfoxide to growing plants may protect them against adverse climatic changes. One dozen potato plants were treated with dimethyl sulfoxide at a concentration of 5,000 p.p.m. by spraying until runoff. One dozen other potato plants were not treated except with distilled water. The young plants were all subjected to a temperature of about 20° F. for a period of about 4 hours. The young plants were then replaced into the greenhouse and allowed to continue growing. All plants were injured but new growth developed within a week. The untreated plants were smaller and less vigorous in growing than were the plants treated with dimethyl sulfoxide. The improved yield obtained from the DMSO treated plants was equivalent to approximately 100 sacks per acre as compared to untreated. DMSO appears to trigger an auxin response resulting in more rapid and vigorous growth.

EXAMPLE 8

Improvement in fruit yield

Early Milton prunes were treated with dimethyl sulfoxide both by spraying and injection. The concentration of dimethyl sulfoxide in the spray was 1,000 cc. per 100 gallons and the concentration of dimethyl sulfoxide in the injection was 10 cc. per gallon. Six trees served as the control check, 6 trees received the dimethyl sulfoxide spray treatment and 6 trees received the dimethyl sulfoxide injection. The average yield in pounds per tree of the control trees was 54.1, the average yield in pounds per tree for the dimethyl sulfoxide spray treatment was 60.6 pounds per tree, and the average yield in pounds per tree for the dimethyl sulfoxide injected trees was 63.8.

EXAMPLE 9

Treatment of sugar beets

The increase in sugar yield of sugar beets treated with dimethyl sulfoxide may be shown as follows: Sugar beets are planted during the middle of April. Uniform germination and emergence should be obtained. The beets are thinned around the end of May. One group of beets serve as a control and are not treated except with normal watering. A second group of beets are sprayed at a level of 100 gallons of water per acre at 100 p.s.i., the water containing 10–15 p.p.m. dimethyl sulfoxide. The latter treatment is repeated at 10-day intervals during the growing season, commenrcing about the end of June. The gross sugar yields of the control beets is about 5,000 pounds per acre. The gross sugar yield of the beets treated with dimethyl sulfoxide shows an increase of about 250 to 300 pounds per acre over that of the controls, and the sugar content of the DMSO treated beets was 0.28% higher, the sugar content of the control being 14.90% and DMSO treated being 15.18%. Similar increases in sugar yield may be obtained with DMSO treatment of sugar cane.

EXAMPLE 10

*Pre-emergent treatment of plants*

Potato tubers, cut for planting, are treated with an aqueous solution of DMSO, the concentration being 2 gallons DMSO in 98 gallons of water. This 100-gallon batch is sufficient to treat enough tubers to plant 10 acres. The treatment is effected by dipping the tubers into the DMSO solution. The DMSO treatment enhances suberization, stimulates shoot development and causes the parent tubers to remain intact for many weeks after planting, adding vigor to the developing plant. More sprouts per tuber piece is generally noted, and this is associated with high crop yield. Similar findings were noted with dahlia tubers, and a similar DMSO treatment may be given to various bulbs, pips, croms and rhizomes with similar enhancement of growth.

In the foregoing specification the various specific examples of materials, procedures and uses are intended to be illustrative only and not limiting as there are many variations which will occur to those having ordinary skill in the art and which are intended to be included within the scope of the following claims.

I claim:
1. A method of stimulating plant growth comprising contacting a living macroscopic plant with an amount of dimethyl sulfoxide effective to enhance the growth of the plant but insufficient to cause undue phytotoxicity.
2. The method of claim 1 wherein said dimethyl sulfoxide is applied as an aqueous solution.
3. The method of claim 2 wherein the concentration of dimethyl sulfoxide in said aqueous solution is up to about 25% by weight of the solution.
4. The method of claim 2 wherein the aqueous solution of dimethyl sulfoxide is applied as a spray.
5. A method of increasing fruit yield in fruit-producing plants comprising applying to the plants an amount of dimethyl sulfoxide effective to enhance fruit production but insufficient to cause undue phytotoxicity.
6. A method of increasing sugar yield in sugar-producing plants comprising applying to the plants an amount of dimethyl sulfoxide effective to enhance sugar production but insufficient to cause undue phytotoxicity.
7. A method of increasing the yield of tubers comprising applying to a tuber piece prior to planting an amount of dimethyl sulfoxide effective to enhance tuber production but insufficient to cause undue phytotoxicity.
8. A method of increasing the yield of tubers comprising applying to a growing tuber plant an amount of dimethyl sulfoxide effective to enhance tuber production but insufficient to cause undue phytotoxicity.

References Cited

UNITED STATES PATENTS

| | | | |
|---|---|---|---|
| 2,654,667 | 10/1953 | Goodhue | 71—2.3 |
| 2,836,512 | 5/1958 | Sample | 167—82 |
| 3,137,582 | 6/1964 | Szczesniak. | |
| 3,177,140 | 4/1965 | Herschler | 167—82 |

OTHER REFERENCES

Bridges, Radiation Research, Vol. 17, 801 to 808, December 1962.

Anderson et al., Weeds, Vol. 14, #3, pages 195 and 196, July 1966.

JAMES O. THOMAS, JR., *Primary Examiner.*